United States Patent
Leum et al.

(10) Patent No.: US 11,273,999 B1
(45) Date of Patent: Mar. 15, 2022

(54) MODULAR LOADING DOCK WITH INTEGRATED LEVELER

(71) Applicant: Leum Engineering, Inc., Excelsior, MN (US)

(72) Inventors: Grant Leum, Excelsior, MN (US); Eric Demerath, Shepherd, MI (US)

(73) Assignee: Leum Engineering, Inc., Minnetonka, MN (US)

( * ) Notice: Subject to any disclaimer, the term of this patent is extended or adjusted under 35 U.S.C. 154(b) by 0 days.

(21) Appl. No.: 17/012,594

(22) Filed: Sep. 4, 2020

(51) Int. Cl.
*B65G 69/28* (2006.01)
*B65G 67/02* (2006.01)

(52) U.S. Cl.
CPC ......... *B65G 69/2864* (2013.01); *B65G 67/02* (2013.01); *B65G 69/287* (2013.01); *B65G 69/2817* (2013.01)

(58) Field of Classification Search
CPC ............ B65G 69/2864; B65G 69/2817; B65G 69/287; B65G 67/02; B65G 69/2805; B65G 69/28
See application file for complete search history.

(56) References Cited

U.S. PATENT DOCUMENTS

| | | |
|---|---|---|
| 2,489,869 A | 11/1949 | Dunn |
| 2,607,937 A | 8/1952 | Stone |
| 2,637,454 A | 5/1953 | Rowe |
| 2,798,620 A | 7/1957 | Allan |
| 2,904,802 A | 9/1959 | Hartman |
| 3,685,077 A | 8/1972 | Wiener et al. |
| 3,806,976 A | 4/1974 | Yoon |
| 4,012,804 A | 3/1977 | Catlett |
| 4,065,824 A | 1/1978 | Ellis et al. |
| 4,209,869 A | 7/1980 | Trine et al. |
| 4,264,259 A | 4/1981 | Hipp |
| 4,348,780 A | 9/1982 | Angelo et al. |

(Continued)

FOREIGN PATENT DOCUMENTS

| | | |
|---|---|---|
| CN | 104060857 A | 9/2014 |
| GB | 702701 | 1/1954 |

(Continued)

OTHER PUBLICATIONS

Installation and Service Manual; PIT and Surface Mounted Truck Leveler (Autoquip Corporation, Feb. 1997).

*Primary Examiner* — Abigail A Risic
(74) *Attorney, Agent, or Firm* — Jansson Munger McKinley & Kirby Ltd.

(57) ABSTRACT

A modular loading dock that includes a planar ramp member with lower and upper ends. The upper end abuts a preexisting structure and the lower end has a lower edge with a lip, the lip is able to be activated between an extended/engaged position to contact a truck bed. The ramp member has an at least thirteen foot long hydraulically-adjustable ramp section with an integrated dock leveler, the entire length of the ramp section is able to be moved between an upward and downward position. The loading dock also includes a base with top and bottom surfaces, the top surface has an opening to receive a dock leveler into the opening and a dock housing consisting of a modular frame mounted onto the base in sections. The length and adjustability of the planar ramp member allows accommodation of large-sized trailers as well as smaller-in-size delivery trucks and vans.

8 Claims, 7 Drawing Sheets

(56) References Cited

U.S. PATENT DOCUMENTS

| | | | |
|---|---|---|---|
| 4,443,905 A * | 4/1984 | Kopp | B65G 69/30 |
| | | | 14/69.5 |
| 4,624,446 A * | 11/1986 | Gould | B65G 69/006 |
| | | | 254/88 |
| 4,665,579 A | 5/1987 | Bennett et al. | |
| 4,689,846 A | 9/1987 | Sherrod | |
| 4,765,792 A | 8/1988 | Cherry et al. | |
| 4,864,672 A * | 9/1989 | Altieri | B65G 69/30 |
| | | | 14/69.5 |
| 4,865,507 A | 9/1989 | Trickle | |
| 4,935,979 A | 6/1990 | Walker et al. | |
| 4,969,792 A | 11/1990 | Ellis et al. | |
| 5,106,246 A | 4/1992 | Chance | |
| 5,195,205 A | 3/1993 | Cook | |
| 5,214,818 A | 6/1993 | Cook | |
| 5,311,628 A * | 5/1994 | Springer | B65G 69/2823 |
| | | | 14/71.1 |
| 5,394,662 A | 3/1995 | Giuliani et al. | |
| 5,396,676 A | 3/1995 | Alexander et al. | |
| 5,553,987 A | 9/1996 | Ellis | |
| 5,622,016 A | 4/1997 | Frommelt et al. | |
| 5,657,502 A | 8/1997 | Ellis | |
| 5,675,945 A | 10/1997 | Giuliani et al. | |
| 5,762,459 A | 6/1998 | Springer et al. | |
| 5,934,857 A | 8/1999 | Alexander | |
| 5,953,868 A | 9/1999 | Giuliani et al. | |
| 6,122,789 A | 9/2000 | Stephenson et al. | |
| 6,205,606 B1 | 3/2001 | Zibella et al. | |
| 6,368,043 B1 | 4/2002 | Leum et al. | |
| 6,442,783 B1 | 9/2002 | Yoon et al. | |
| 6,676,359 B2 | 1/2004 | Ganiere | |
| 6,898,815 B2 | 5/2005 | Young | |
| 7,146,673 B1 | 12/2006 | Digmann et al. | |
| 7,533,431 B2 | 5/2009 | Hochstein et al. | |
| 7,670,096 B2 | 3/2010 | Leum | |
| D640,854 S | 6/2011 | Leum | |
| 8,424,254 B2 | 4/2013 | Ballester | |
| 8,510,888 B2 | 8/2013 | Eungard | |
| D712,112 S | 8/2014 | Leum | |
| 8,800,086 B1 * | 8/2014 | Borgerding | B65G 69/2876 |
| | | | 14/71.1 |
| 8,826,963 B2 | 9/2014 | Wiegel et al. | |
| 8,869,334 B1 | 10/2014 | Leum | |
| 9,131,509 B2 | 9/2015 | Malkawi et al. | |
| 9,162,831 B2 | 10/2015 | De Jong | |
| 9,187,155 B2 | 11/2015 | Prins | |
| 9,688,493 B2 | 6/2017 | Leum | |
| 9,776,547 B2 | 10/2017 | Lin | |
| 9,944,475 B1 | 4/2018 | Leum et al. | |
| 10,370,207 B1 | 8/2019 | Leum | |
| 10,479,624 B2 | 11/2019 | Leum | |
| 10,815,103 B1 | 10/2020 | Leum | |
| 2003/0005530 A1 | 1/2003 | Digmann et al. | |
| 2003/0199996 A1 | 10/2003 | Reynard et al. | |
| 2004/0221404 A1 | 11/2004 | Bender et al. | |
| 2006/0043350 A1 | 3/2006 | Branstetter | |
| 2006/0056944 A1 | 3/2006 | Henblad et al. | |
| 2006/0245869 A1 | 11/2006 | Leum | |
| 2008/0184503 A1 | 8/2008 | Andersen et al. | |
| 2008/0302029 A1 | 12/2008 | Desjardins | |
| 2009/0189130 A1 | 7/2009 | Heinz | |
| 2010/0242189 A1 * | 9/2010 | Goin | B65G 69/28 |
| | | | 14/71.1 |
| 2010/0264596 A1 * | 10/2010 | Whitley | B65G 69/287 |
| | | | 277/316 |
| 2014/0271100 A1 | 9/2014 | Giemza | |
| 2015/0000211 A1 * | 1/2015 | Whelan | B65G 69/2864 |
| | | | 52/2.12 |
| 2015/0007509 A1 * | 1/2015 | Digmann | E04B 1/3441 |
| | | | 52/173.2 |
| 2015/0128360 A1 * | 5/2015 | Leum | B65G 69/30 |
| | | | 14/72.5 |
| 2016/0104364 A1 * | 4/2016 | Brooks | B65G 69/287 |
| | | | 340/686.1 |
| 2016/0280478 A1 * | 9/2016 | Gleason | B65G 69/008 |
| 2016/0374876 A1 | 12/2016 | Thornton et al. | |
| 2017/0073176 A1 * | 3/2017 | Yule | E01D 18/00 |
| 2019/0367299 A1 * | 12/2019 | Jeon | B60P 7/13 |
| 2020/0125074 A1 * | 4/2020 | Ramos | E05F 15/73 |

FOREIGN PATENT DOCUMENTS

| | | |
|---|---|---|
| GB | 916257 | 1/1963 |
| WO | WO2016137315 A1 | 9/2016 |

* cited by examiner

MODULAR LOADING DOCK WITH INTEGRATED LEVELER

FIELD OF THE INVENTION

This invention relates to modular loading docks and more particularly to a loading dock which includes an integrated dock leveler and a housing.

BACKGROUND OF THE INVENTION

A variety of loading docks both with and without surrounding structural frames have been devised to adjust the height of different trailers to properly match the deck of the trailer to the height of the dock. By aligning the height of the trailer and the dock the loading and unloading of cargo is facilitated.

One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock.

A similar device is disclosed in U.S. Pat. No. 4,765,792 to Cherry, et al. which also discloses a pivotally-mounted and hydraulically-raised platform. In addition to the disclosure of Gould, the device includes mounting the hydraulics inwardly from the non-mounted end of the platform and an aperture in the non-mounted end of the platform to accommodate a truck restraining device.

Another design is disclosed in U.S. Patent No. 6,368,043 to Leum, et al. which teaches a low-profile truck leveler. In this design a low-profile leveler is enabled through the use of a raised rear beam and two lateral beams that extend above the upper surface of the platform. In addition, a central beam adds further to the leveler's strength and rigidity.

Some loading docks of the prior art include surrounding frame structure, however, none of these loading docks include a hydraulically adjustable long ramp section with a dock leveler installed at the end. It is to this need that this invention is drawn.

This device overcomes certain problems and shortcomings in the prior art, including those mentioned above and others, and provides advantages for a loading dock not previously provided.

OBJECTS OF THE INVENTION

It is an object of this invention to provide a loading dock which is modular and able to be easily assembled and disassembled without the need for concrete construction.

Another object of this invention is to provide such a loading dock which integrates conventional loading dock levelers.

Another object of this invention is to provide a loading dock which includes a hydraulically adjustable ramp section that can be used with an integral dock leveler or a portable plate for use with smaller vehicles.

Yet another object of this invention is to provide a safe loading dock for foot traffic for loading and unloading of parcels for last mile delivery.

These and other objects of the invention will be apparent from the following descriptions and from the drawings.

SUMMARY OF THE INVENTION

In a preferred embodiment of the present invention a modular loading dock with a planar ramp member that has a lower end and an upper end, the upper end abutting a preexisting structure and the lower end including a lower edge having a lip, the lip being able to be activated between an extended/engaged position to contact a truck bed and a retracted/disengaged position, the planar ramp member having an at least thirteen foot long hydraulically-adjustable ramp section with an integrated dock leveler, the entire length of the ramp section being able to be moved between an upward and downward position, a base including top and bottom surfaces, the top surface having an opening to receive a dock leveler into such opening; and a dock housing consisting of a modular frame mounted onto the base in sections, such sections including a frame-front wall, opposed frame-sidewalls and a frame-top wall, the frame-front wall having a vehicle-receiving opening to receive a back end of a vehicle, the frame-sidewalls being secured to a wall of a building. It is highly preferable that the length and adjustability of the planar ramp member allows accommodation of large-sized trailers as well as smaller-in-size delivery trucks and vans.

Preferably the modular loading dock further includes a portable plate adjacent the lip which can be used to bridge a space between a distal end of the lip and a back end of a delivery truck or van. In preferred embodiments, an operator can use either the dock leveler at the lower end of the planar ramp member or alternatively an operator can insert a portable plate for use with a van or smaller-in-size delivery truck.

It is highly preferable that the planar ramp member is a thirteen-foot hydraulically adjustable ramp. It is also preferred that the ramp member is adjustable and allows an operator to adjust the height of the ramp member with a pushbutton control. The ramp member will indefinitely hold its height position once it has been adjusted.

Preferred embodiments include the dock housing portion of the modular loading ramp having frame-sidewalls which are bolted to the wall of a building. It is also preferable that the base includes a slotted-attachment for connection and securement of the frame-sidewalls to the base. Preferred embodiments also include a removable base and modular frame which can be transported to different locations.

DETAILED DESCRIPTION OF PREFERRED EMBODIMENTS

Figure 1:
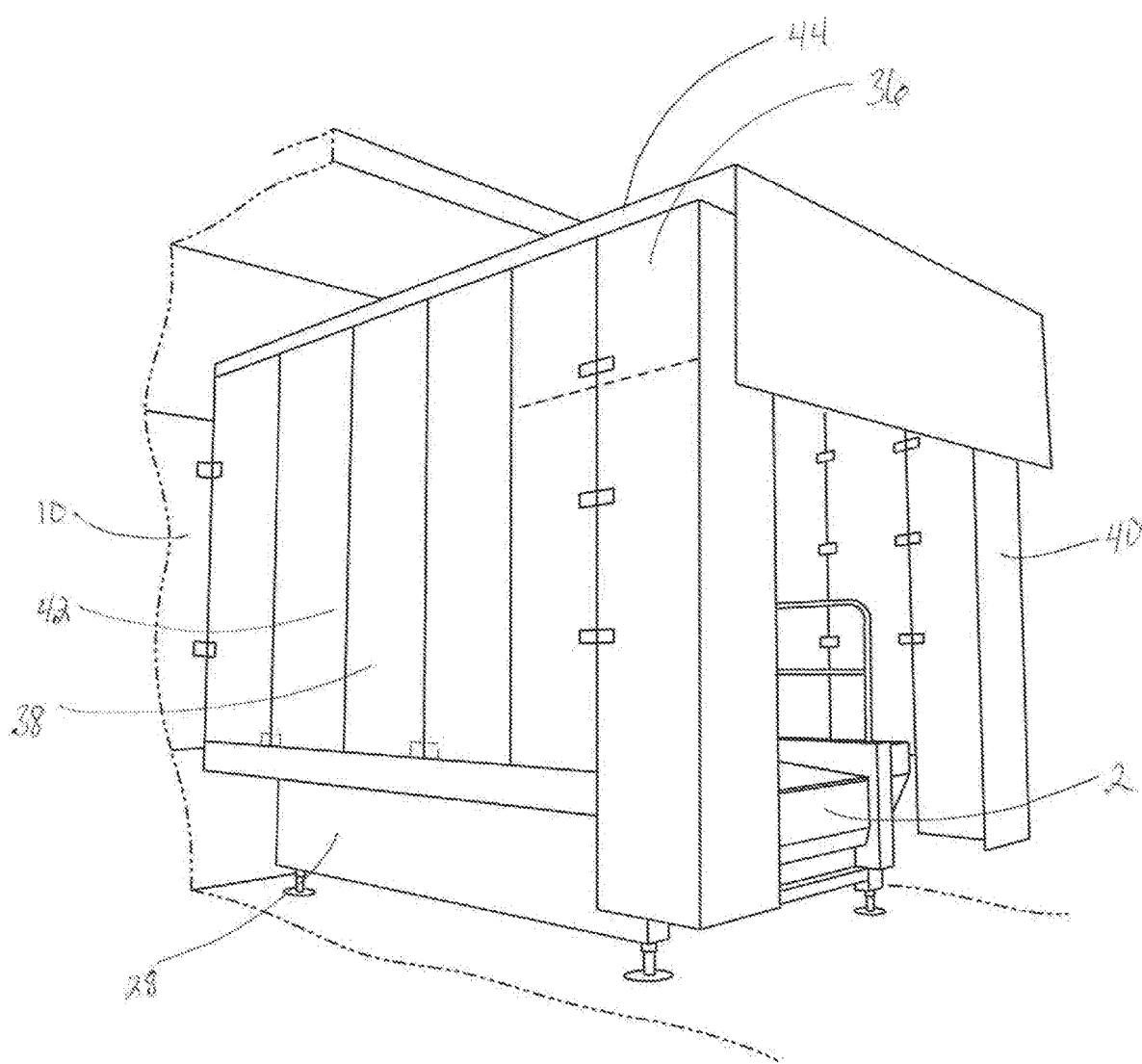
FIG. 1 is a perspective view of a fully-assembled modular loading dock with dock housing.

A preferred embodiment of the present invention is shown in FIGS. 1-8. FIGS. 1-8 illustrate a modular loading dock 2 having a planar ramp member 4 with a lower end 6 and an upper end 8. Upper end 8 abuts a preexisting structure 10 and lower end 6 includes a lower edge having a lip 12. Lip 12 is able to be activated between an extended/engaged position 14 to contact a truck bed 18 and a retracted/disengaged position 16. Planar ramp member 4 has an at least thirteen foot long hydraulically-adjustable ramp section 20 with an integrated dock leveler 22, the entire length of ramp section 20 being able to be moved between an upward position 24 and a downward position 26.

FIG. 1 illustrates modular loading dock 2 with a dock housing 36. Dock housing 36 includes a modular frame 38 mounted onto a base 28 in sections. Dock housing 36 includes a frame-front wall 40, opposed frame-sidewalls 42 and a frame-top wall 44. Frame-front wall 40 has a vehicle-receiving opening 46 to receive a back end of a vehicle 48. Frame-sidewalls 42 of dock housing 36 are secured to a wall of a building 50. FIG. 1 also illustrates that base 28 includes top and bottom surfaces 30, 32. Top surface 30 has an opening 52 to receive dock leveler 22 into such opening 52.

Figure 2:
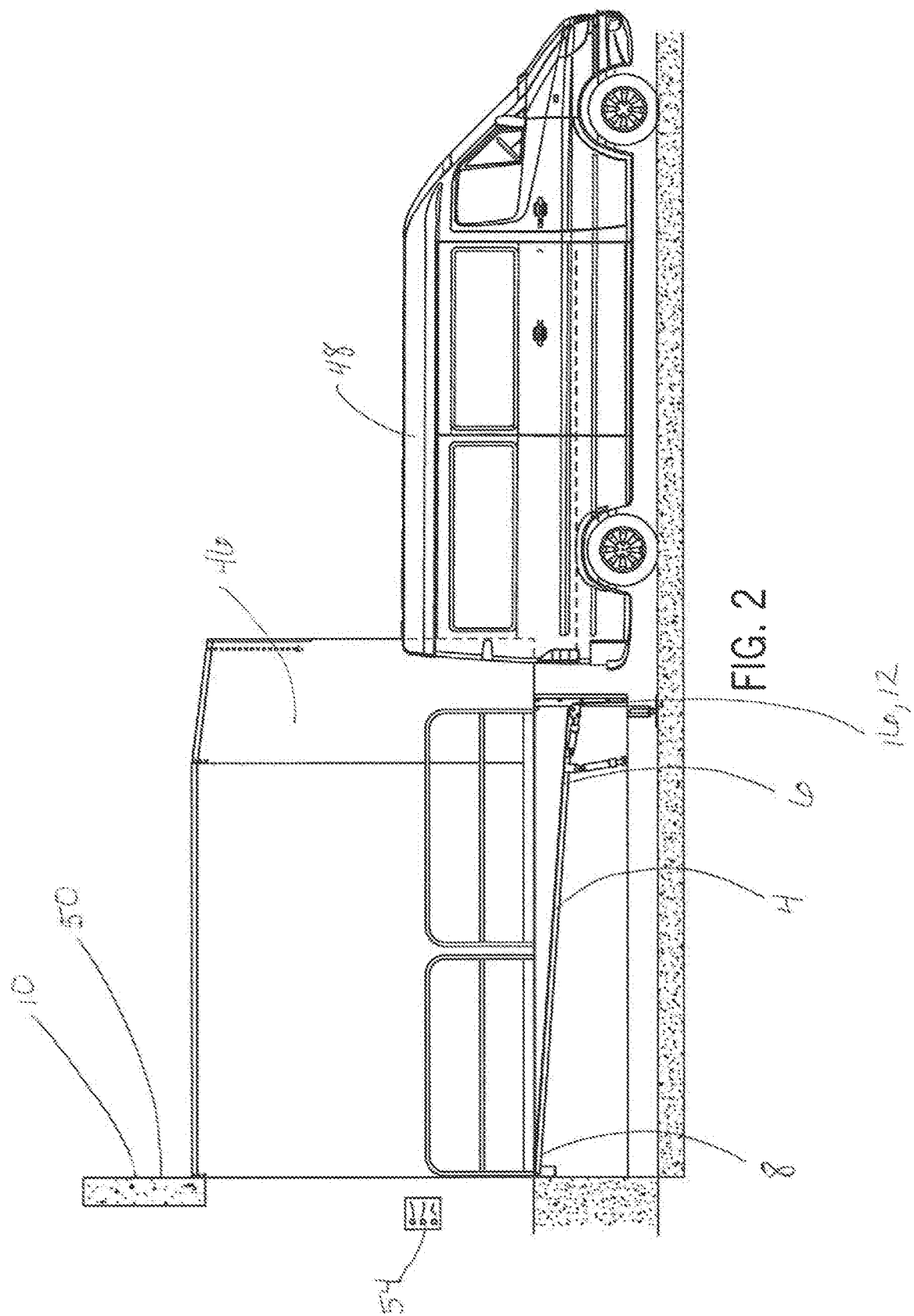
FIG. 2 is perspective view of the modular loading dock with the lip in a lowered/disengaged position.
Figure 3:
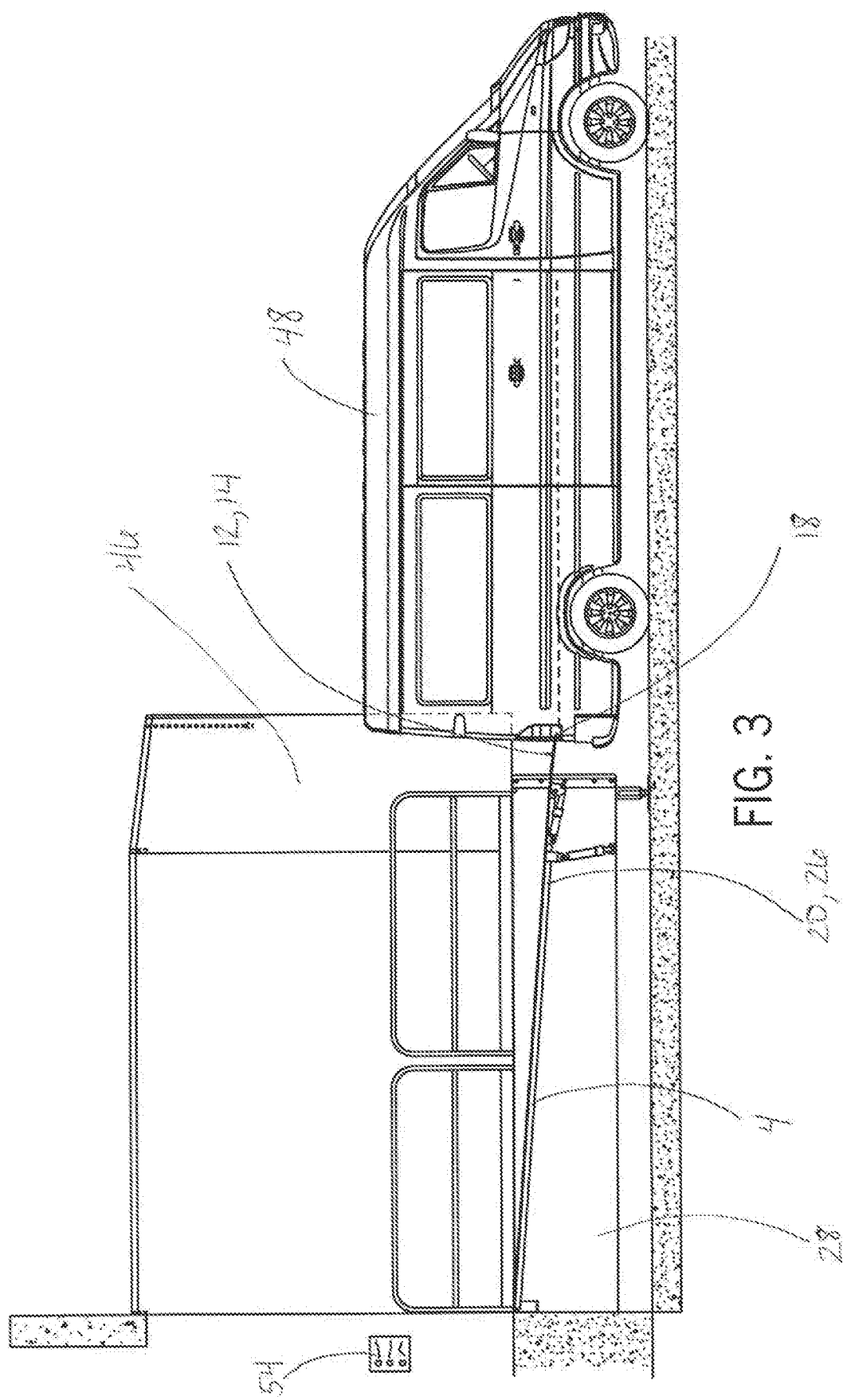
FIG. 3 is a perspective view of the modular loading dock with the lip extended and contacting the vehicle.
Figure 6:
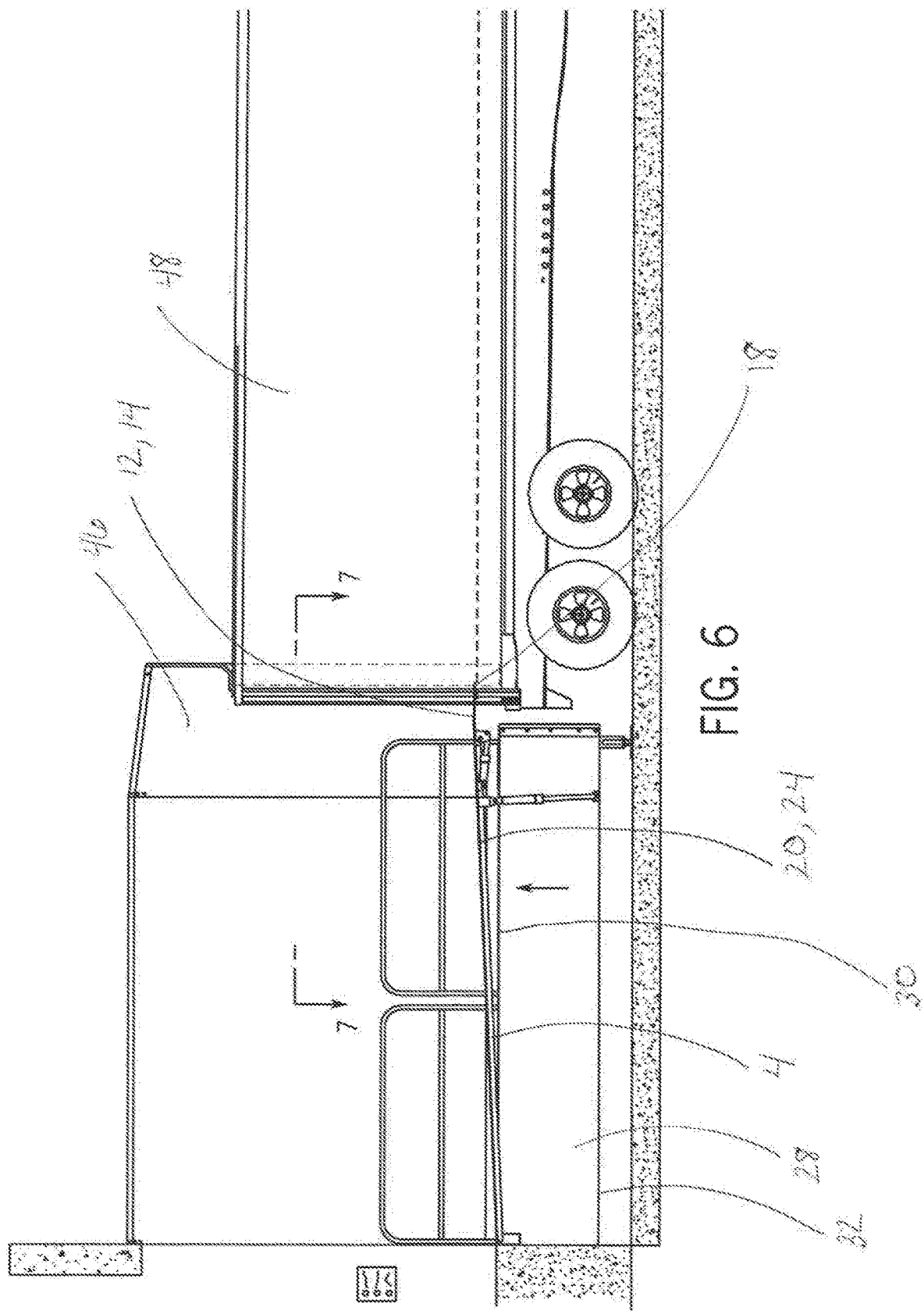
FIG. 6 is a perspective view of the modular loading dock with the lip extended and contacting a trailer.

FIGS. 2-3 and 6 illustrate that the length and adjustability of planar ramp member 4 allows accommodation of large-sized trailers as well as smaller-in-size delivery trucks and vans. Planar ramp member 4 is fully-adjustable as seen in FIGS. 2-3 and 6. Planar ramp member 4 is at least thirteen feet long and is completely hydraulically adjustable and has dock leveler 22 installed at one end. The integral adjustable ramp member 4 allows the operator to adjust the ramp member 4 via pushbutton controls 54 to the proper height for the type of vehicle being loaded or unloaded. Once adjusted, planar ramp member 4 will then hold the position to which it has been adjusted indefinitely. This will allow the operator to either use integral dock leveler 22 at lower ramp end 6 or alternatively, insert a portable plate 56 for use with smaller vehicles. The extreme length of planar ramp member 4 allows a safe grade for foot traffic for loading and unloading parcels.

In FIG. 2 the lip is shown in the lowered/disengaged and retracted position 16. FIG. 3 in contrast illustrates lip 12 in the extended/engaged position 14 and is shown contacting the bed of a small delivery vehicle 48.

Figure 4:
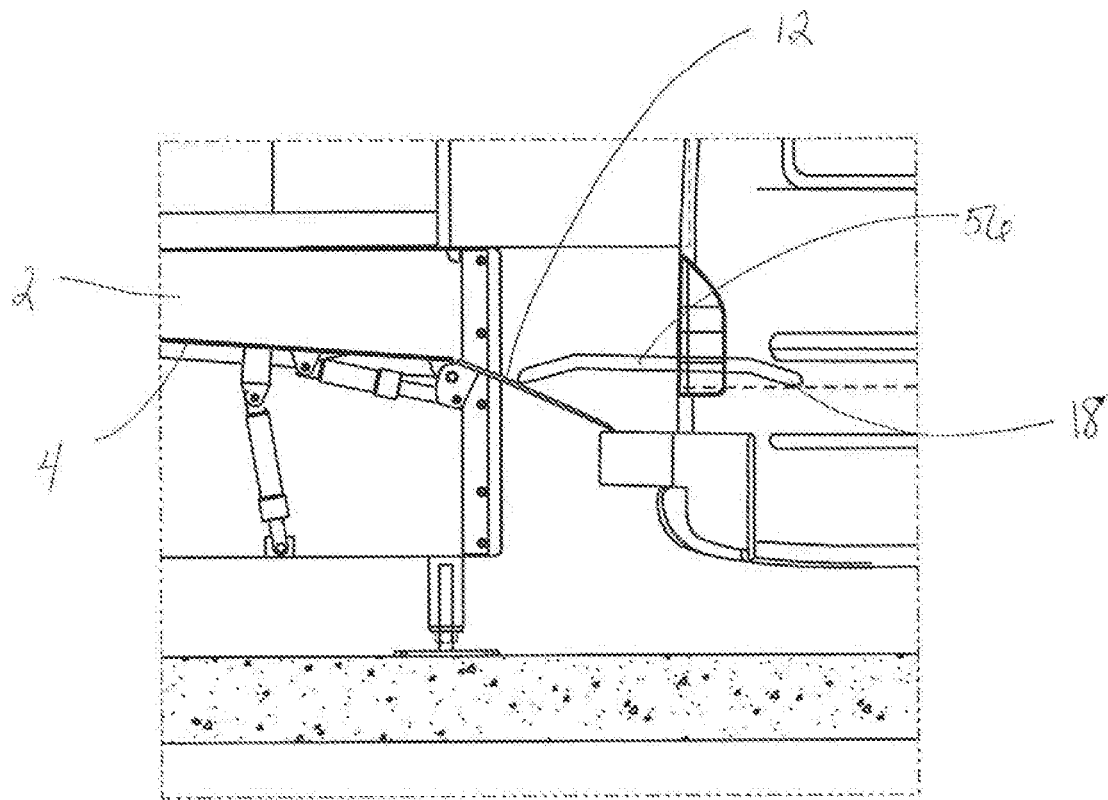
FIG. 4 is a partial view illustrating the portable plate on the surface of the lip and contacting a vehicle.
Figure 5:
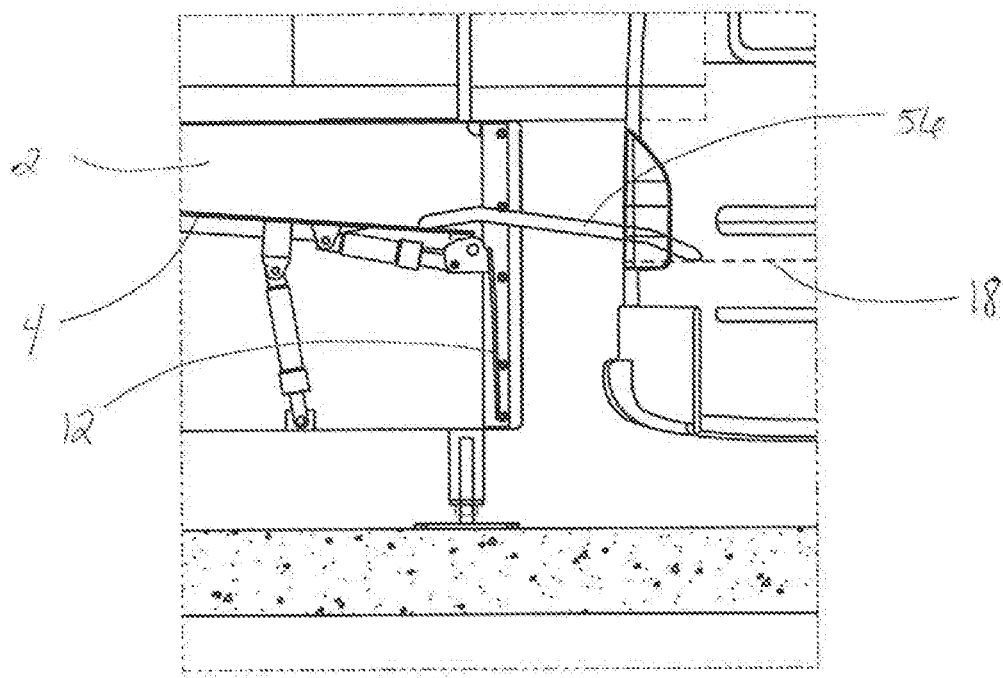
FIG. 5 is a partial view illustrating the portable plate contacting a vehicle and the lip in the lowered/disengaged position.

FIGS. 4-5 show portable plate 56 contacting the bed of a delivery vehicle 48. As seen in FIG. 4, portable plate 56 can be placed on the top surface of lip 12 or alternatively portable plate 56 can be used without the lip in the extended position as seen in FIG. 5. Portable plate 56 as seen in FIGS. 4-5 is used to bridge a space between a distal end 58 of lip 12 and a back end of a delivery truck or van or between the lower end 6 of planar ramp member 4 and the back end of a delivery truck. An operator can use either dock leveler 22 with lip 12 at the lower end 6 of planar ramp member 4 or alternatively an operator can insert portable plate 56 for use with a van or small-sized delivery truck.

Both FIGS. 2-3 illustrate planar ramp member 4 in a lowered, downward ramp position 26. Planar ramp member 4 is seen in the upward ramp position 24 in FIG. 6. This illustrates how universal modular loading dock 2 is, given its long planar ramp member 4 which is highly adjustable. FIG. 6 also shows lip 12 contacting the bed 18 of a large vehicle 48. The directional arrow in FIG. 6 indicates that planar ramp member 4 is in the upward, elevated ramp position 24.

Figure 7:
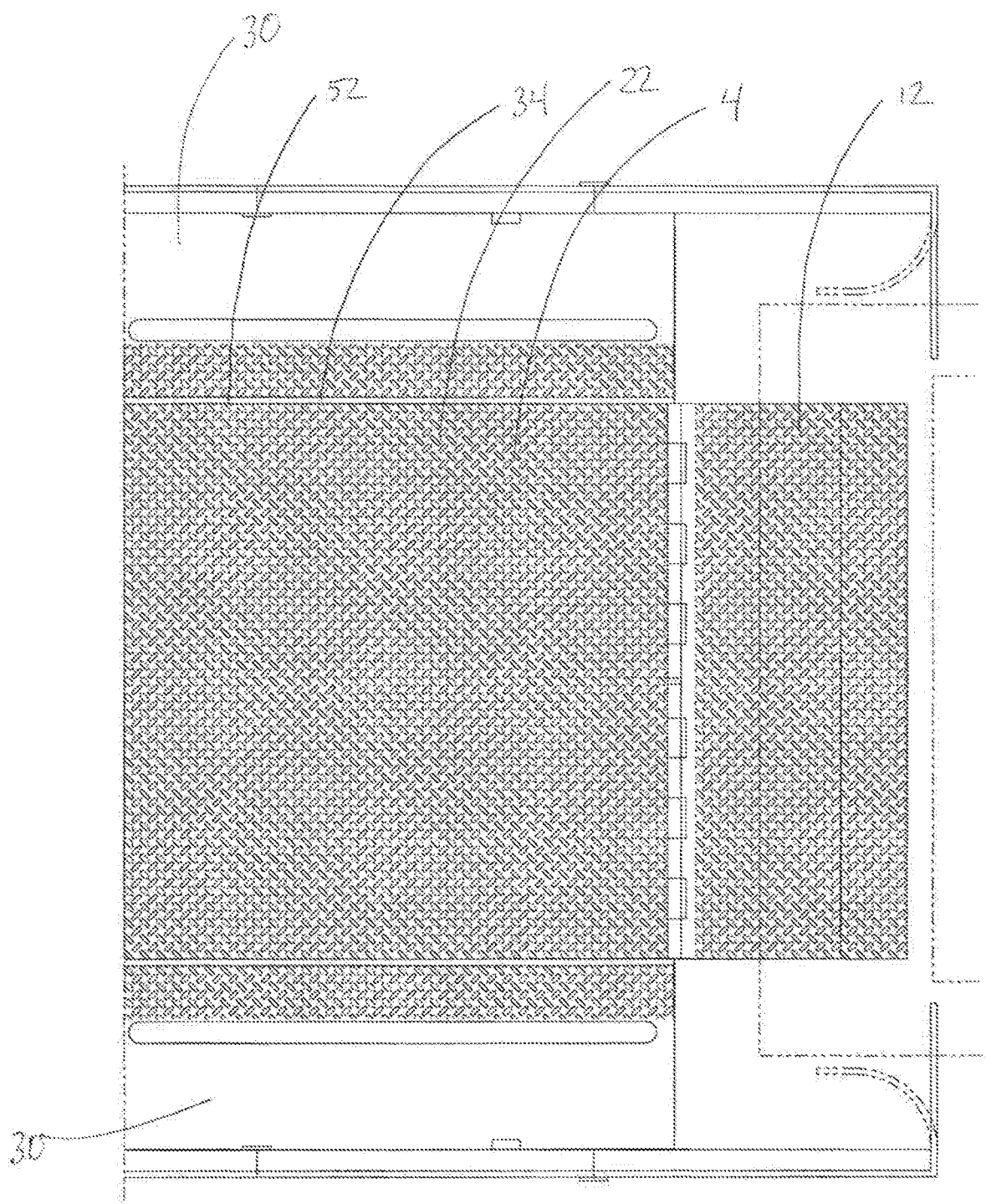
FIG. 7 is a sectional view taken along line 7-7 of FIG. 6 illustrating the planar ramp member and dock leveler.

FIG. 7 illustrates the top surface of planar ramp member 4 as well as the fact that opening 52 can be configured to receive a variety of dock levelers of different sizes and shapes. FIG. 7 illustrates the location of dock leveler 22 and lip 12.

Figure 8:
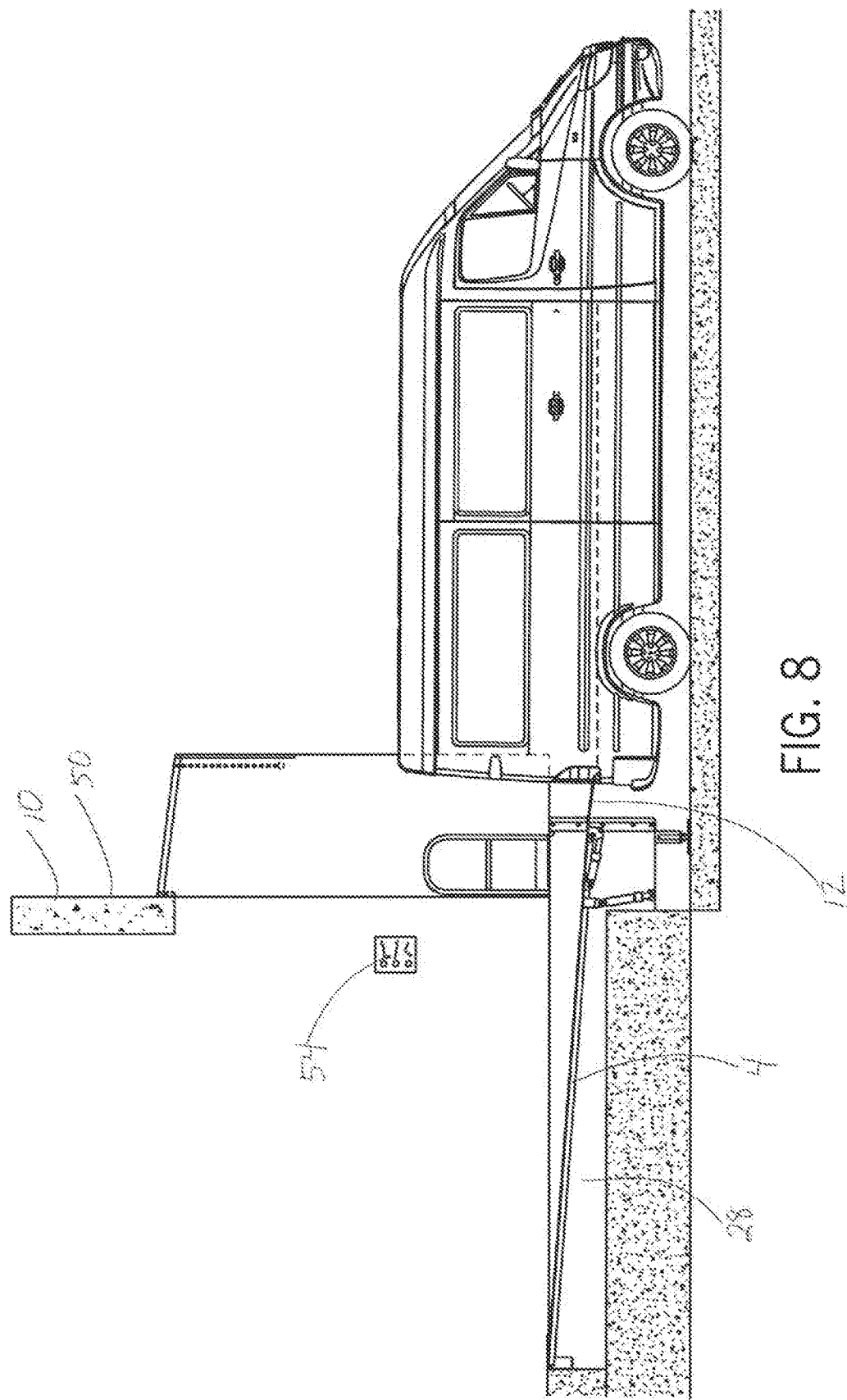
FIG. 8 is a perspective view of the modular loading dock.

In FIG. 8 a portion of modular loading dock 2 is installed into a building and dock housing 36 is smaller in size than dock housing in FIGS. 2-3 and 6. FIG. 8 illustrates that loading dock 2 can be installed adjacent a wall of a building 50 as seen in FIGS. 2-3 and 6 or installed partially in the building as seen in FIG. 8.

As seen in FIGS. 2-6, and 8 planar ramp member 4 is adjustable and allows an operator to adjust the height of planar ramp member 4 with a pushbutton control 54. Ramp member 4 will indefinitely hold its height position once it has been adjusted.

Planar ramp member 4 is easily removable and able to be transported to different locations. Base 28 and dock housing 36 are removable and also able to be transported to different locations.

FIG. 1 illustrates that frame-sidewalls 42 are bolted to the wall of a building 50. FIG. 1 also illustrates that base 28 includes a securement mechanism for connection and securement of frame-sidewalls 42 to base 28. Dock housing 36 includes a vehicle-receiving opening 46 as seen best in FIG. 1. FIG. 1 illustrates a fully-assembled dock housing 36. Dock housing 36 can be configured to receive a variety of dock levelers of different sizes and shapes.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:
1. A modular loading dock comprising:
a planar ramp member having a lower end and an upper end, the upper end abutting a preexisting structure and the lower end including a lower edge having a lip, the lip being able to be activated between an extended/engaged position to contact a truck bed and a retracted/disengaged position, the planar ramp member having an at least thirteen foot long hydraulically-adjustable ramp section with an integrated dock leveler, the entire length of the ramp section being able to be moved between an upward and downward position to facilitate lip-only contact with the truck bed,
a base including top and bottom surfaces, the top surface having an opening to receive a dock leveler into such opening; and
a dock housing consisting of a modular frame mounted onto the base in sections, such sections including a frame-front wall, opposed frame-sidewalls and a frame-top wall, the frame-front wall having a vehicle-receiving opening to receive a back end of a vehicle, the frame-sidewalls being secured to a wall of a building, the dock housing spanning the distance of the planar ramp member;
wherein the length and adjustability of the planar ramp member allows accommodation of large-sized trailers as well as smaller-in-size delivery trucks and vans.
2. The modular loading dock of claim 1 further including a unitary portable plate adjacent the lip and able to be used to bridge a space between a distal end of the lip and a back end of a delivery truck or van.
3. The modular loading dock of claim 2 wherein an operator can use either the dock leveler at the lower end of the planar ramp member or alternatively an operator can insert a portable plate for use with a van or smaller-in-size delivery truck.

4. The modular loading dock of claim 1 wherein the planar ramp member is a thirteen-foot hydraulically adjustable ramp.

5. The modular loading dock of claim 1 wherein the ramp member is adjustable and allows an operator to adjust the height of the ramp member with a pushbutton control, the ramp member will indefinitely hold its height position once it has been adjusted.

6. The modular loading dock of claim 1 wherein the frame-sidewalls are bolted to the wall of a building.

7. The modular loading dock of claim 1 wherein the base includes a securement mechanism for connection and securement of the frame-sidewalls to the base.

8. The modular loading dock of claim 1 wherein the base and dock housing are removable and able to be transported to different locations.

* * * * *